(12) United States Patent
Oto

(10) Patent No.: US 11,189,843 B2
(45) Date of Patent: Nov. 30, 2021

(54) MEMBRANE CATALYST LAYER ASSEMBLY OF ELECTROCHEMICAL DEVICE, MEMBRANE ELECTRODE ASSEMBLY, ELECTROCHEMICAL DEVICE, METHOD FOR MANUFACTURING MEMBRANE CATALYST LAYER ASSEMBLY OF ELECTROCHEMICAL DEVICE

(71) Applicant: Panasonic Intellectual Property Management Co., Ltd., Osaka (JP)

(72) Inventor: Takashi Oto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 191 days.

(21) Appl. No.: 16/299,894

(22) Filed: Mar. 12, 2019

(65) Prior Publication Data

US 2019/0319276 A1 Oct. 17, 2019

(30) Foreign Application Priority Data

Apr. 13, 2018 (JP) .............................. JP2018-077913

(51) Int. Cl.
*H01M 4/92* (2006.01)
*H01M 8/1018* (2016.01)
*C01B 32/30* (2017.01)

(52) U.S. Cl.
CPC .............. *H01M 4/926* (2013.01); *C01B 32/30* (2017.08); *H01M 8/1018* (2013.01);
(Continued)

(58) Field of Classification Search
None
See application file for complete search history.

(56) References Cited

U.S. PATENT DOCUMENTS 6,818,339 B1* 11/2004 Sugawara ........... H01M 4/8605
429/492
2009/0130527 A1* 5/2009 McLean .............. H01M 8/0247
429/513
(Continued)

FOREIGN PATENT DOCUMENTS

EP 3392938 A1 10/2018
JP 2010-123572 6/2010
(Continued)

OTHER PUBLICATIONS

The Extended European Search Report dated Jul. 3, 2019 for the related European Patent Application No. 19162799.1.

*Primary Examiner* — Lisa S Park
(74) *Attorney, Agent, or Firm* — McDermott Will and Emery LLP

(57) ABSTRACT

A membrane catalyst layer assembly includes: a PEM; and a pair of catalyst layers disposed on main surfaces of the PEM. One of the pair of catalyst layers contains: mesoporous carbon with an average particle size of 100 nm or more, the mesoporous carbon having mesopores with a mode radius of 1-25 nm and a pore volume of 1.0-3.0 cm$^3$/g; a catalytic metal; a proton-conducting resin; and at least one type of carbon particles with a smaller average particle size than the mesoporous carbon. The one of the pair of catalyst layers has a first surface layer which is adjacent to the PEM and contains the mesoporous carbon, and a second surface layer which is opposite the PEM and contains the mesoporous carbon, a volume percentage of the mesoporous carbon in the second surface layer is lower than a volume percentage of the mesoporous carbon in the first surface layer.

15 Claims, 6 Drawing Sheets

(52) U.S. Cl.
CPC ...... *C01P 2006/14* (2013.01); *C01P 2006/16* (2013.01); *H01M 2008/1095* (2013.01)

(56) References Cited

U.S. PATENT DOCUMENTS

| | | |
|---|---|---|
| 2011/0318254 A1 | 12/2011 | Morishita |
| 2016/0064744 A1 | 3/2016 | Mashio et al. |
| 2016/0079605 A1* | 3/2016 | Mashio ............... H01M 8/1004 429/482 |

FOREIGN PATENT DOCUMENTS

| | | |
|---|---|---|
| JP | 2010-208887 | 9/2010 |
| WO | 2014/175106 | 10/2014 |

\* cited by examiner

FIG. 1
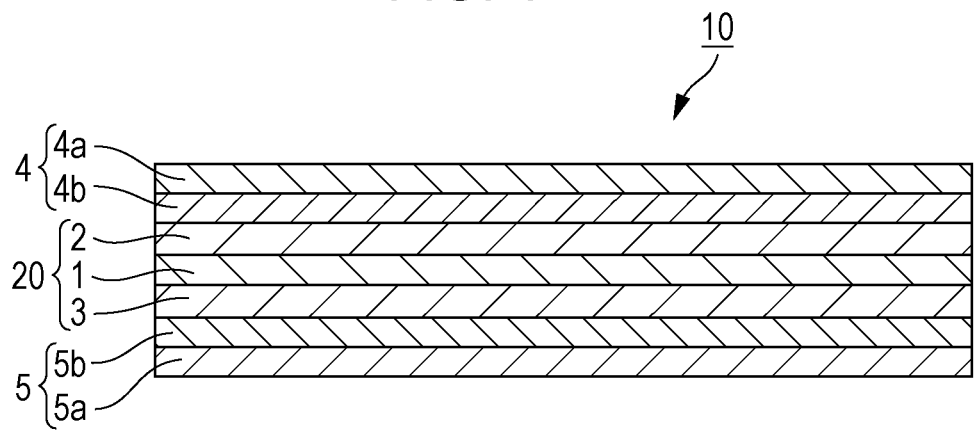
FIG. 2
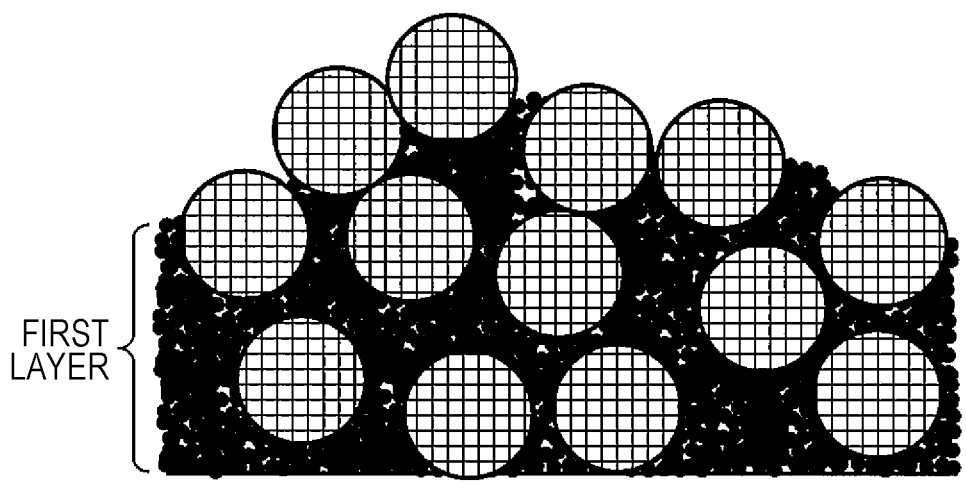
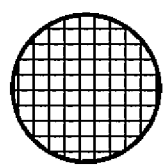 : MESOPOROUS CARBON
• : CARBON PARTICLES

|  | CARRIER |
|---|---|
| AVERAGE PARTICLE SIZE μm | 0.42 |
| PORE VOLUME cm³/g (RADIUS 2–10 nm) | 1.8 |
| MODE RADIUS nm | 3.3 |
| BET SPECIFIC SURFACE AREA m²/g | 1300 |

MEMBRANE CATALYST LAYER ASSEMBLY OF ELECTROCHEMICAL DEVICE, MEMBRANE ELECTRODE ASSEMBLY, ELECTROCHEMICAL DEVICE, METHOD FOR MANUFACTURING MEMBRANE CATALYST LAYER ASSEMBLY OF ELECTROCHEMICAL DEVICE

BACKGROUND

1. Technical Field

The present disclosure relates to a membrane catalyst layer assembly for use in an electrochemical device, a membrane electrode assembly, an electrochemical device including a membrane electrode assembly, and a method for manufacturing a membrane catalyst layer assembly.

2. Description of the Related Art

Fuel cells are known as examples of electrochemical devices. Fuel cells are power generation systems in which hydrogen is supplied as a fuel to an anode of a cell serving as a power generation device, air containing oxygen is supplied as an oxidizing agent to a cathode of the cell, and thereby water is produced on an electrode containing a catalyst.

A cell serving as a power generation device includes a membrane electrode assembly (hereinafter referred to as MEA) for the water-producing reaction. A catalyst layer of a membrane catalyst layer assembly in a membrane electrode assembly is typically formed by preparing a catalyst paste, applying the catalyst paste to a polymer electrolyte membrane (hereinafter referred to as PEM) or another substrate, and drying the catalyst paste. The catalyst paste is prepared by dispersing a catalyst and a proton-conducting resin (hereinafter referred to as an ionomer), which is a proton-conducting polymer electrolyte, in a solvent, such as water or an alcohol. The catalyst contains a catalytic metal, such as platinum, on an electrically conductive material, such as carbon black.

Focusing on a catalyst layer in a membrane electrode assembly, various propositions have been made to improve the performance of fuel cells. For example, a method for forming a catalyst layer is proposed in WO 2014/175106 in which a mesoporous carbon carrier containing catalytic metal particles therein is covered with an ionomer to prevent ionomer poisoning of the catalytic metal.

Focusing on the water-holding capacity of a catalyst layer, a fuel cell including a membrane electrode assembly is proposed in Japanese Patent No. 5458801 that can achieve high performance independent of the humidification conditions or load conditions. More specifically, a catalyst layer with a two-layer structure is proposed in a fuel cell according to Japanese Patent No. 5458801. The two-layer structure includes, as an inner layer in contact with a proton-conducting electrolyte film, a catalyst layer containing a catalyst carrier carbon material with micropores and, as an outer layer separated from the proton-conducting electrolyte film, a catalyst layer containing a catalyst carrier carbon material with a developed structure. In such a catalyst layer with a two-layer structure, the outer layer that is rarely blocked with water in its gaseous diffusion path operates mainly under high humidification conditions or in high load operation, and the inner layer can store water supplied or produced. Under low humidification conditions or in low load operation, water in the inner layer can prevent an electrolyte material in the catalyst layer from being dried. Thus, a fuel cell disclosed in Japanese Patent No. 5458801 can reduce the decrease in power generation performance.

SUMMARY

One non-limiting and exemplary embodiment provides a membrane catalyst layer assembly of an electrochemical device that can reduce poisoning of a catalytic metal caused by a proton-conducting resin and that can reduce an increase in the contact resistance between a catalyst layer and a gas diffusion layer in contact with the catalyst layer, a membrane electrode assembly, an electrochemical device, and a method for manufacturing a membrane catalyst layer assembly of an electrochemical device.

In one general aspect, the techniques disclosed here feature a membrane catalyst layer assembly of an electrochemical device that includes: a polymer electrolyte membrane; and a pair of catalyst layers disposed on main surfaces of the polymer electrolyte membrane. One of the pair of catalyst layers contains: mesoporous carbon with an average particle size of 100 nm or more, the mesoporous carbon having mesopores with a mode radius in the range of 1 to 25 nm and a pore volume in the range of 1.0 to 3.0 $cm^3/g$; a catalytic metal; a proton-conducting resin; and at least one type of carbon particles with a smaller average particle size than the mesoporous carbon. The one of the pair of catalyst layers has a first surface layer which is adjacent to the polymer electrolyte membrane and contains the mesoporous carbon, and a second surface layer which is opposite the polymer electrolyte membrane and contains the mesoporous carbon, a volume percentage of the mesoporous carbon in the second surface layer is lower than a volume percentage of the mesoporous carbon in the first surface layer.

The present disclosure is configured as described above and can advantageously reduce poisoning of a catalytic metal caused by a proton-conducting resin and reduce an increase in the contact resistance between a catalyst layer and a gas diffusion layer in contact with the catalyst layer.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 1 is a schematic view of a membrane electrode assembly according to an embodiment of the present disclosure;

FIG. 2 is a schematic view of the surface conditions of a catalyst layer with a monolayer structure formed of a first layer containing mesoporous carbon in a membrane catalyst layer assembly in a membrane electrode assembly according to an embodiment of the present disclosure;

DETAILED DESCRIPTION

Underlying Knowledge Forming Basis of the Present Disclosure

As described above, a catalyst layer of a membrane catalyst layer assembly is typically formed by preparing an electrode paste, applying the electrode paste to a polymer electrolyte membrane or another substrate, and drying the electrode paste. The electrode paste is prepared by dispersing a catalyst and a proton-conducting ionomer in a solvent, such as water or an alcohol. The catalyst contains a catalytic metal, such as platinum, on an electrically conductive material, such as carbon black.

In a three-phase interface structure of the catalyst layer thus formed, the catalytic metal is covered with the ionomer. In the three-phase interface structure, it has been believed that bringing a catalytic metal into contact with an ionomer to supply a catalytic metal surface with protons can improve performance. In recent years, however, it has been found that contact with an ionomer causes poisoning of a catalytic metal. Thus, it has been pointed out that contact between a catalytic metal and an ionomer impairs performance.

To address such a problem, WO 2014/175106 discloses a method for avoiding contact between an ionomer and a catalytic metal by placing the catalytic metal within a carbon carrier with large-volume pores, such as mesoporous carbon. More specifically, WO 2014/175106 discloses a technique of placing catalytic platinum alloy fine particles within mesoporous carbon with mesopores 1 to 10 nm in radius and 2.5 to 10 nm in mode radius.

The present inventors carefully examined prior art documents and found that when a catalyst layer contains mesoporous carbon with a large particle size, power generation performance degrades due to a high contact resistance between the catalyst layer and a gas diffusion layer in contact with the catalyst layer.

In a catalyst ink containing mesoporous carbon containing a catalytic metal, an ionomer, which is typically tens of nanometers in size, rarely enters the mesopores and rarely causes poisoning of the catalytic metal, for example, Pt.

Depending on the ionomer size distribution and the mesopore size distribution, however, due to its tendency to adsorb to Pt, an ionomer may partly enter the mesopores, adsorb to Pt around the mesoporous carbon surface, and thereby reduce catalytic activity.

Thus, even when a catalytic metal Pt is placed within mesoporous carbon to prevent ionomer poisoning of Pt, ionomer poisoning of Pt may occur around the surface of mesoporous carbon particles. Thus, the particle size of mesoporous carbon can be increased to decrease the ratio of Pt around the surface of a mesoporous carbon particle to the whole Pt within the mesoporous carbon particle.

Figure 9:
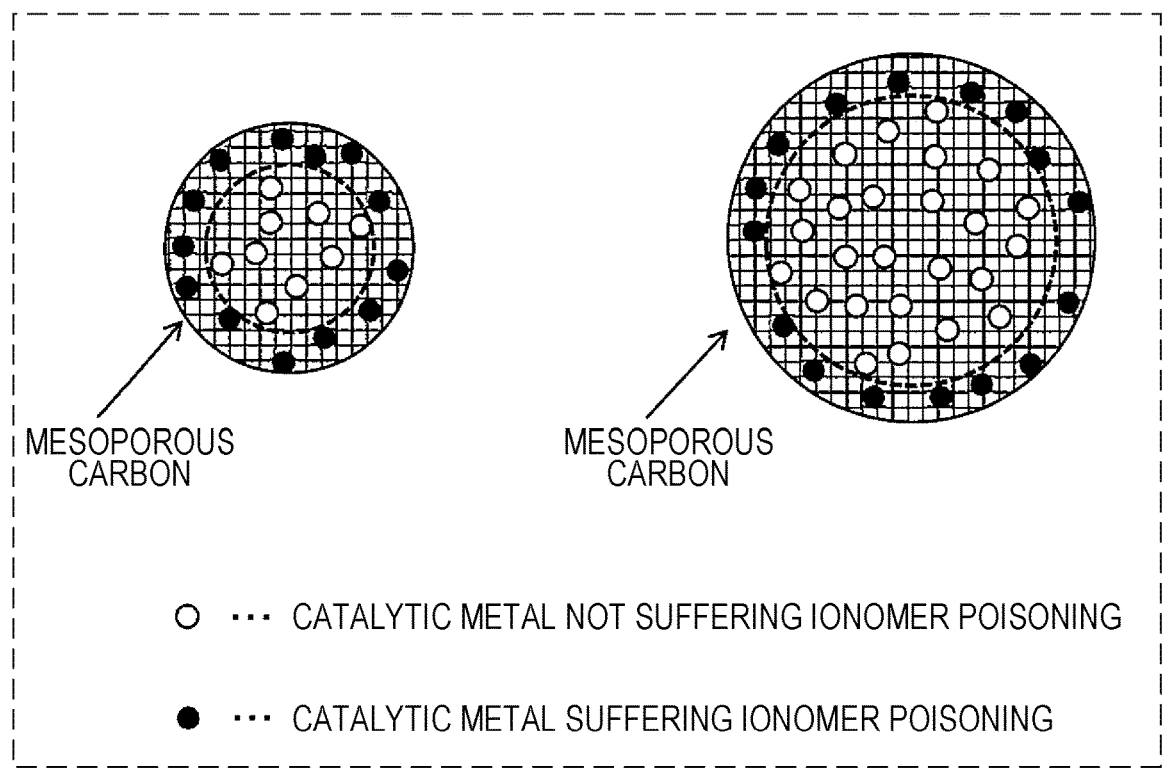
FIG. 9 is a schematic view of the relationship between the particle size of mesoporous carbon and ionomer poisoning.

More specifically, as illustrated in FIG. 9, the ratio of Pt around the surface of a particle to the whole Pt within the particle is higher in mesoporous carbon with a small particle size than in mesoporous carbon with a large particle size. Thus, mesoporous carbon with a small particle size is more likely to suffer ionomer poisoning and has reduced catalytic activity. FIG. 9 is a schematic view of the relationship between the particle size of mesoporous carbon and ionomer poisoning. In FIG. 9, open circles represent catalytic metal not suffering ionomer poisoning, and filled circles represent catalytic metal suffering ionomer poisoning. A solid line circle surrounding the filled circles and open circles indicates the particle size of mesoporous carbon. In FIG. 9, mesoporous carbon on the left side has a smaller particle size than mesoporous carbon on the right side. A broken line circle in mesoporous carbon indicates the boundary between the region not suffering ionomer poisoning and the region suffering ionomer poisoning.

The term "mesoporous carbon", as used herein, refers to porous carbon with mesopores 1 to 25 nm in radius. The pore structure of mesoporous carbon can be controlled as desired, for example, by changing the mold or carbon source or by altering the forming conditions, such as firing temperature.

The term "membrane catalyst layer assembly", as used herein, refers to an assembly that includes a polymer electrolyte membrane and a pair of catalyst layers disposed on the main surfaces of the polymer electrolyte membrane. The term "membrane electrode assembly", as used herein, refers to an assembly that includes a pair of gas diffusion layers on the main surfaces of a pair of catalyst layers of a membrane catalyst layer assembly.

It was found that a catalyst layer containing mesoporous carbon with an increased particle size has greater surface roughness than a catalyst layer formed of carbon particles (such as carbon black) with a smaller particle size than mesoporous carbon. It was also found that a membrane catalyst layer assembly including a catalyst layer containing mesoporous carbon has a rougher catalyst layer surface than a membrane catalyst layer assembly including a catalyst layer formed of carbon particles with a small particle size and therefore has increased contact resistance between a catalyst layer and a gas diffusion layer in contact with the catalyst layer.

As a result of extensive studies, the present inventors arrived at the present disclosure by finding a catalyst layer structure that can reduce the contact resistance between a catalyst layer and a gas diffusion layer even when the catalyst layer contains mesoporous carbon with a large particle size, wherein a catalytic metal is placed within the mesoporous carbon with pores to avoid contact between an ionomer and the catalytic metal.

More specifically, a main surface of a catalyst layer containing mesoporous carbon, which is a carbon material with mesopores containing a catalytic metal, the main surface being in contact with a gas diffusion layer, is covered with carbon particles (for example, carbon black) with a smaller average particle size D50 than the mesoporous carbon. The carbon particles support no catalytic metal. In other words, a first catalyst layer containing mesoporous carbon is formed in contact with a polymer electrolyte membrane, and a second catalyst layer composed of carbon particles is formed on the first catalyst layer. Thus, in the catalyst layer, a volume percentage of the mesoporous carbon in a second surface layer opposite the polymer electrolyte membrane is lower than a volume percentage of the mesoporous carbon in a first surface layer adjacent to the polymer electrolyte membrane where the first surface layer contains the mesoporous carbon and the second surface layer contains the mesoporous carbon.

In a catalyst layer thus formed, the rough surface of the first catalyst layer due to the large particle size of mesoporous carbon can be flattened with the second catalyst layer composed of carbon particles. This can reduce an increase in the contact resistance between the catalyst layer and a gas diffusion layer.

These findings of the present inventors have not been disclosed and have novel technical features with significant operational advantages. The present disclosure more specifically provides the following aspects.

A membrane catalyst layer assembly of an electrochemical device according to a first aspect of the present disclosure includes: a polymer electrolyte membrane; and a pair of catalyst layers disposed on main surfaces of the polymer electrolyte membrane. One of the pair of catalyst layers contains: mesoporous carbon with an average particle size of 100 nm or more, the mesoporous carbon having mesopores with a mode radius in the range of 1 to 25 nm and a pore volume in the range of 1.0 to 3.0 $cm^3/g$; a catalytic metal; a proton-conducting resin; and at least one type of carbon particles with a smaller average particle size than the mesoporous carbon. The one of the pair of catalyst layers has a first surface layer which is adjacent to the polymer electrolyte membrane and contains the mesoporous carbon, and a second surface layer which is opposite the polymer electrolyte membrane and contains the mesoporous carbon, a volume percentage of the mesoporous carbon in the second surface layer is lower than a volume percentage of the mesoporous carbon in the first surface layer.

A membrane catalyst layer assembly of an electrochemical device according to a second aspect of the present disclosure includes: a polymer electrolyte membrane; and a pair of catalyst layers disposed on main surfaces of the polymer electrolyte membrane. One of the pair of catalyst layers contains: mesoporous carbon with an average particle size of 100 nm or more, the mesoporous carbon having mesopores with a mode radius in the range of 1 to 25 nm and a pore volume in the range of 1.0 to 3.0 $cm^3/g$; a catalytic metal supported on the mesoporous carbon; a proton-conducting resin; and at least one type of carbon particles with a smaller average particle size than the mesoporous carbon. The one of the pair of catalyst layers has a first surface layer which is adjacent to the polymer electrolyte membrane and contains the mesoporous carbon, and a second surface layer which is opposite the polymer electrolyte membrane and contains the mesoporous carbon, a volume percentage of the mesoporous carbon in the second surface layer is lower than a volume percentage of the mesoporous carbon in the first surface layer.

The term "mode radius", as used herein, refers to the radius that is most frequently measured in the mesopore size distribution of mesoporous carbon. The term "average particle size", as used herein, refers to the median size (D50) in the particle size distribution of mesoporous carbon.

Thus, the catalyst layers contain mesoporous carbon having mesopores controlled to have the mode radius and the pore volume specified above and having an average particle size of 100 nm or more, and the catalytic metal can be loaded within the mesoporous carbon through the mesopores. The catalytic metal within the mesoporous carbon can be protected from poisoning caused by a proton-conducting resin.

In the catalyst layers, a volume percentage of the catalytic metal in a second surface layer opposite the polymer electrolyte membrane is lower than a volume percentage of the catalytic metal in a first surface layer adjacent to the polymer electrolyte membrane In other words, a volume percentage of the mesoporous carbon in a second surface layer opposite the polymer electrolyte membrane is lower than a volume percentage of the mesoporous carbon in a first surface layer adjacent to the polymer electrolyte membrane where the first surface layer contains the mesoporous carbon and the second surface layer contains the mesoporous carbon.

Thus, in the catalyst layers, roughness due to the large particle size of mesoporous carbon can be more greatly reduced in a surface layer opposite the polymer electrolyte membrane than in a surface layer adjacent to the polymer electrolyte membrane.

Thus, in the membrane catalyst layer assembly of the electrochemical device, roughness due to the large particle size of mesoporous carbon can be more greatly reduced in a surface layer opposite the polymer electrolyte membrane than in a surface layer adjacent to the polymer electrolyte membrane.

This can reduce an increase in the contact resistance between a catalyst layer of the membrane catalyst layer assembly in the electrochemical device and a gas diffusion layer in contact with the catalyst layer.

Thus, the membrane catalyst layer assembly of the electrochemical device according to the first aspect of the present disclosure can reduce poisoning of the catalytic metal caused by the proton-conducting resin and reduce an increase in the contact resistance between the catalyst layers and the gas diffusion layers in contact with the catalyst layers.

According to a third aspect of the present disclosure, the mesoporous carbon in the membrane catalyst layer assembly of the electrochemical device according to the first or second aspect may have the average particle size of 1000 nm or less.

According to a fourth aspect of the present disclosure, in the membrane catalyst layer assembly of the electrochemical device according to any one of the first to third aspects, the at least one type of carbon particles contain first carbon particles, and a volume percentage of the first carbon particles in the second surface layer is higher than a volume percentage of the first carbon particles in the first surface layer.

Thus, the first carbon particles in a surface layer opposite the polymer electrolyte membrane have a higher volume percentage than the first carbon particles in a surface layer adjacent to the polymer electrolyte membrane. Thus, in the membrane catalyst layer assembly of the electrochemical device, roughness due to the large particle size of mesoporous carbon can be more greatly reduced in a surface layer opposite the polymer electrolyte membrane than in a surface layer adjacent to the polymer electrolyte membrane.

This can reduce an increase in the contact resistance between a catalyst layer of the membrane catalyst layer assembly in the electrochemical device and a gas diffusion layer in contact with the catalyst layer.

According to a fifth aspect of the present disclosure, in the membrane catalyst layer assembly of the electrochemical device according to any one of the first to third aspects, the at least one type of carbon particles contain first carbon particles in the first surface layer and second carbon particles in the second surface layer, and a volume percentage of the second carbon particles is higher than a volume percentage of the first carbon particles.

Thus, the second carbon particles in a surface layer opposite the polymer electrolyte membrane have a higher volume percentage than the first carbon particles in a surface layer adjacent to the polymer electrolyte membrane. Thus, in the membrane catalyst layer assembly of the electrochemical device, roughness due to the large particle size of mesoporous carbon can be more greatly reduced in a surface layer opposite the polymer electrolyte membrane than in a surface layer adjacent to the polymer electrolyte membrane.

This can reduce an increase in the contact resistance between a catalyst layer of the membrane catalyst layer assembly in the electrochemical device and a gas diffusion layer in contact with the catalyst layer.

According to a sixth aspect of the present disclosure, in the membrane catalyst layer assembly of the electrochemical device according to any one of the first to fifth aspects, the at least one type of carbon particles may have an average primary particle size in the range of 30 to 50 nm.

According to a seventh aspect of the present disclosure, in the membrane catalyst layer assembly of the electrochemical device according to any one of the first to sixth aspects, the one of the pair of catalyst layers may be a cathode catalyst layer.

Thus, the catalytic metal within the mesoporous carbon can be protected from poisoning caused by a proton-conducting resin. In particular, when one catalyst layer is a cathode catalyst layer, poisoning of the catalytic metal can be more effectively reduced, because the cathode catalyst layer requires higher activity than an anode catalyst layer.

A membrane electrode assembly according to an eighth aspect of the present disclosure includes a polymer electrolyte membrane and a pair of catalyst layers disposed on main surfaces of the polymer electrolyte membrane, wherein one of the pair of catalyst layers contains mesoporous carbon with an average particle size of 100 nm or more, the mesoporous carbon having mesopores with a mode radius in the range of 1 to 25 nm and a pore volume in the range of 1.0 to 3.0 $cm^3/g$, a catalytic metal, a proton-conducting resin, and at least one type of carbon particles with a smaller average particle size than the mesoporous carbon. The membrane electrode assembly includes a membrane catalyst layer assembly in which a volume percentage of the mesoporous carbon in a second surface layer opposite the polymer electrolyte membrane is lower than a volume percentage of the mesoporous carbon in a first surface layer adjacent to the polymer electrolyte membrane where the first surface layer contains the mesoporous carbon and the second surface layer contains the mesoporous carbon, and a pair of gas diffusion layers disposed on the pair of catalyst layers of the membrane catalyst layer assembly.

Alternatively, a membrane electrode assembly according to an eighth aspect of the present disclosure includes a polymer electrolyte membrane and a pair of catalyst layers disposed on main surfaces of the polymer electrolyte membrane, wherein one of the pair of catalyst layers contains mesoporous carbon with an average particle size of 100 nm or more, the mesoporous carbon having mesopores with a mode radius in the range of 1 to 25 nm and a pore volume in the range of 1.0 to 3.0 $cm^3/g$, a catalytic metal supported on the mesoporous carbon, a proton-conducting resin, and at least one type of carbon particles with a smaller average particle size than the mesoporous carbon. The membrane electrode assembly includes a membrane catalyst layer assembly in which a volume percentage of the catalytic metal in a second surface layer opposite the polymer electrolyte membrane is lower than a volume percentage of the catalytic metal in a first surface layer adjacent to the polymer electrolyte membrane where the first surface layer contains the mesoporous carbon and the second surface layer contains the mesoporous carbon, and a pair of gas diffusion layers disposed on the pair of catalyst layers of the membrane catalyst layer assembly.

Thus, the catalyst layers contain mesoporous carbon having mesopores controlled to have the mode radius and the pore volume specified above and having an average particle size of 100 nm or more, and the catalytic metal can be loaded within the mesoporous carbon through the mesopores. The catalytic metal within the mesoporous carbon can be protected from poisoning caused by a proton-conducting resin.

In the catalyst layers, a volume percentage of the catalytic metal in a second surface layer opposite the polymer electrolyte membrane is lower than a volume percentage of the catalytic metal in a first surface layer adjacent to the polymer electrolyte membrane. In other words, a volume percentage of the mesoporous carbon in a second surface layer opposite the polymer electrolyte membrane is lower than a volume percentage of the mesoporous carbon in a first surface layer adjacent to the polymer electrolyte membrane where the first surface layer contains the mesoporous carbon and the second surface layer contains the mesoporous carbon.

Thus, in the catalyst layers, roughness due to the large particle size of mesoporous carbon can be more greatly reduced in a surface layer opposite the polymer electrolyte membrane than in a surface layer adjacent to the polymer electrolyte membrane.

This can reduce an increase in the contact resistance between a catalyst layer of the membrane catalyst layer assembly in the electrochemical device and a gas diffusion layer in contact with the catalyst layer.

Thus, the membrane electrode assembly according to the eighth aspect of the present disclosure can reduce poisoning of the catalytic metal caused by the proton-conducting resin and reduce an increase in the contact resistance between the catalyst layers and the gas diffusion layers in contact with the catalyst layers.

According to a ninth aspect of the present disclosure, in the membrane electrode assembly according to the eighth aspect, a gas diffusion layer disposed on one of the pair of catalyst layers may have a carbon layer containing third carbon particles on its main surface in contact with the one of the pair of catalyst layers, and the carbon layer may have higher water repellency than a surface layer of the one of the pair of catalyst layers adjacent to the gas diffusion layer.

According to a tenth aspect of the present disclosure, in the membrane electrode assembly according to the ninth aspect, the surface layer of the catalyst layer adjacent to the gas diffusion layer may contain the proton-conducting resin, and the carbon layer may contain a water-repellent resin.

An electrochemical device according to an eleventh aspect of the present disclosure includes a polymer electrolyte membrane and a pair of catalyst layers disposed on main surfaces of the polymer electrolyte membrane, wherein one of the pair of catalyst layers contains mesoporous carbon with an average particle size of 100 nm or more, the mesoporous carbon having mesopores with a mode radius in the range of 1 to 25 nm and a pore volume in the range of 1.0 to 3.0 $cm^3/g$, a catalytic metal, a proton-conducting resin, and at least one type of carbon particles with a smaller average particle size than the mesoporous carbon. The electrochemical device includes a membrane electrode assembly that includes a membrane catalyst layer assembly in which a volume percentage of the mesoporous carbon in a second surface layer opposite the polymer electrolyte membrane is lower than a volume percentage of the mesoporous carbon in a first surface layer adjacent to the polymer electrolyte membrane where the first surface layer contains the mesoporous carbon and the second surface layer contains the mesoporous carbon, and a pair of gas diffusion layers disposed on the pair of catalyst layers of the membrane catalyst layer assembly.

Thus, in the membrane electrode assembly of the electrochemical device, the catalyst layers contain mesoporous carbon having mesopores controlled to have the mode radius and the pore volume specified above and having an average particle size of 100 nm or more. Thus, the catalytic metal can be loaded within the mesoporous carbon. This can reduce poisoning of the catalytic metal caused by the proton-conducting resin.

In the catalyst layers, a volume percentage of the catalytic metal in a second surface layer opposite the polymer electrolyte membrane is lower than a volume percentage of the catalytic metal in a first surface layer adjacent to the polymer electrolyte membrane. In other words, a volume percentage of the mesoporous carbon in a second surface layer opposite the polymer electrolyte membrane is lower than a volume percentage of the mesoporous carbon in a first surface layer adjacent to the polymer electrolyte membrane where the first surface layer contains the mesoporous carbon and the second surface layer contains the mesoporous carbon.

Thus, in the catalyst layers, roughness due to the large particle size of mesoporous carbon can be more greatly reduced in a surface layer opposite the polymer electrolyte membrane than in a surface layer adjacent to the polymer electrolyte membrane.

This can reduce an increase in the contact resistance between a catalyst layer of the membrane catalyst layer assembly in the electrochemical device and a gas diffusion layer in contact with the catalyst layer.

Thus, the electrochemical device according to the eleventh aspect of the present disclosure can reduce poisoning of the catalytic metal caused by the proton-conducting resin and reduce an increase in the contact resistance between the catalyst layers and the gas diffusion layers in contact with the catalyst layers.

A method for manufacturing a membrane catalyst layer assembly of an electrochemical device according to a twelfth aspect of the present disclosure includes applying a mixed solution to a main surface of a polymer electrolyte membrane to form a catalyst layer, the mixed solution containing mesoporous carbon with an average particle size of 100 nm or more, the mesoporous carbon supporting a catalytic metal and having mesopores with a mode radius in the range of 1 to 25 nm and a pore volume in the range of 1.0 to 3.0 cm$^3$/g, a proton-conducting resin, and first carbon particles with a smaller average particle size than the mesoporous carbon, and applying a mixed solution to the catalyst layer to form a carbon layer, the mixed solution containing fourth carbon particles with a smaller average particle size than the mesoporous carbon and containing the proton-conducting resin.

The fourth carbon particles may contain a water-repellent resin as in the third carbon particles or may be the same as the first carbon particles.

Embodiments of the present disclosure will be described below with reference to the accompanying drawings. These embodiments illustrate the above aspects, and the shapes, materials, components, and the arrangements of the components described below are only examples. Thus, the present disclosure is not limited to these embodiments.

Like or corresponding components are denoted by like reference numerals and letters throughout the figures and may not be described again. Components are schematically illustrated for the sake of clarity, and their shapes and dimensions may not be accurate.

Embodiments

A fuel cell is described below as an example of an electrochemical device according to an embodiment of the present disclosure. However, the electrochemical device is not limited to the fuel cell and may be a water electrolyzer for electrolyzing water to produce hydrogen and oxygen. Alternatively, the electrochemical device may be a hydrogen pump that supplies an anode with hydrogen, supplies electricity from the outside, and selectively and electrochemically transfers only hydrogen through a membrane electrode assembly.

Membrane Electrode Assembly

Figure 3:
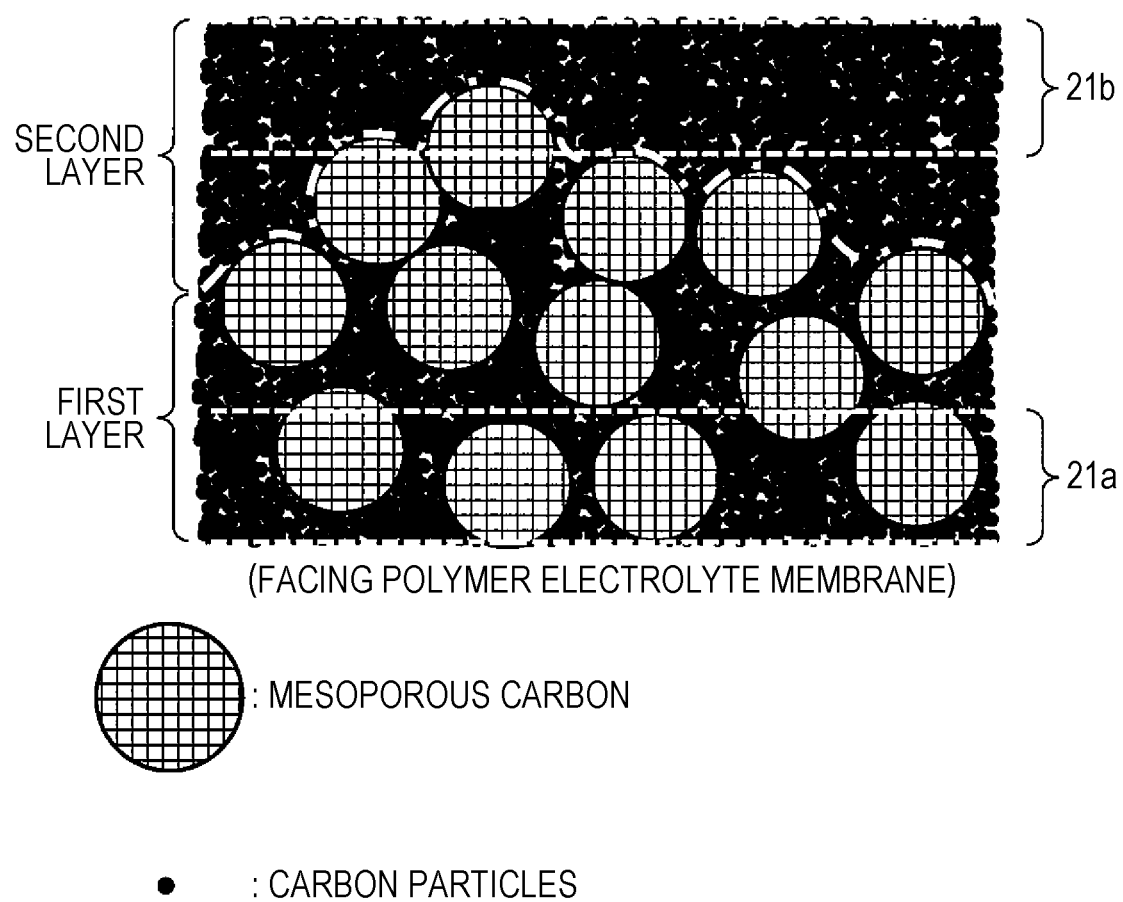
FIG. 3 is a schematic view of the surface conditions of a catalyst layer with a two-layer structure formed of a first layer containing mesoporous carbon and a second layer containing carbon particles in a membrane catalyst layer assembly according to an embodiment of the present disclosure.
Figure 4:
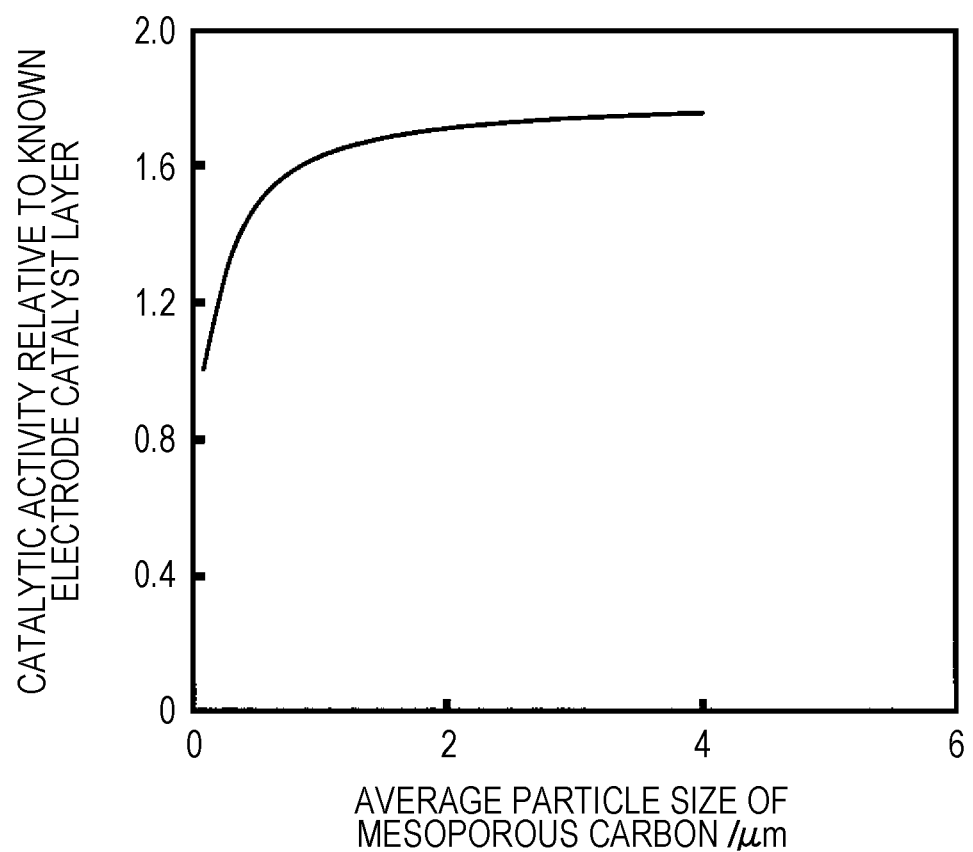
FIG. 4 is a graph of the relationship between the average particle size of mesoporous carbon and catalytic activity relative to that of a known electrode catalyst layer.

Referring to FIGS. 1 to 4, a membrane electrode assembly 10 according to an embodiment of the present disclosure will be described below. FIG. 1 is a schematic view of the membrane electrode assembly 10 according to an embodiment of the present disclosure. FIG. 2 is a schematic view of the surface conditions of a catalyst layer with a monolayer structure formed of a first layer containing mesoporous carbon in a membrane catalyst layer assembly 20 in the membrane electrode assembly 10 according to an embodiment of the present disclosure. FIG. 3 is a schematic view of the surface conditions of a catalyst layer with a two-layer structure formed of a first layer containing mesoporous carbon and a second layer containing carbon particles in the membrane catalyst layer assembly 20 of the membrane electrode assembly 10 according to an embodiment of the present disclosure. FIG. 4 is a graph of the relationship between the average particle size of mesoporous carbon and catalytic activity relative to that of a known catalyst layer. In the known catalyst layer, a catalytic metal is supported on electrically conductive carbon black and is covered with an ionomer.

As illustrated in FIG. 1, the membrane electrode assembly (MEA) 10 includes the membrane catalyst layer assembly 20 and a pair of gas diffusion layers (a cathode gas diffusion layer 4 and an anode gas diffusion layer 5). The membrane catalyst layer assembly 20 includes a polymer electrolyte membrane 1 and a pair of catalyst layers (a cathode catalyst layer 2 and an anode catalyst layer 3) disposed on the main surfaces of the polymer electrolyte membrane 1. One of the pair of catalyst layers contains mesoporous carbon with an average particle size of 100 nm or more, the mesoporous carbon having mesopores with a mode radius in the range of 1 to 25 nm and a pore volume in the range of 1.0 to 3.0 cm$^3$/g, a catalytic metal, a proton-conducting resin, and at least one type of carbon particles with a smaller average particle size than the mesoporous carbon. The mesoporous carbon has a smaller volume percentage in a surface layer opposite the polymer electrolyte membrane 1 (a second surface layer 21b described later in FIG. 3) than in a surface layer containing mesoporous carbon adjacent to the polymer electrolyte membrane 1 (a first surface layer 21a described later in FIG. 3). In other words, the catalytic metal has a smaller volume percentage in the second surface layer 21b containing mesoporous carbon opposite the polymer electrolyte membrane 1 than in the first surface layer 21a containing mesoporous carbon adjacent to the polymer electrolyte membrane 1.

More specifically, the membrane catalyst layer assembly 20 includes the polymer electrolyte membrane 1 and the pair of catalyst layers (the cathode catalyst layer 2 and the anode catalyst layer 3) with the polymer electrolyte membrane 1 interposed therebetween. A pair of gas diffusion layers are disposed on the pair of catalyst layers opposite the polymer electrolyte membrane 1.

Thus, one catalyst layer (the cathode catalyst layer 2) is disposed on one side of the polymer electrolyte membrane 1, and the other catalyst layer (the anode catalyst layer 3) is disposed on the other side of the polymer electrolyte membrane 1. Furthermore, the cathode gas diffusion layer 4 is disposed on the cathode catalyst layer 2, and the anode gas diffusion layer 5 is disposed on the anode catalyst layer 3.

The polymer electrolyte membrane 1 provides ionic (proton) conduction between the cathode catalyst layer 2 and the anode catalyst layer 3 and requires proton conductivity and gas barrier properties. The polymer electrolyte membrane 1 is an ion-exchange fluoropolymer membrane or an ion-exchange hydrocarbon resin membrane, for example. In particular, perfluorosulfonic acid resin membranes are preferred because of their high proton conductivity and their stability, for example, in a power generation environment of fuel cells.

The ion-exchange resin preferably has an ion exchange capacity in the range of 0.9 to 2.0 milliequivalents per gram of dry resin. An ion exchange capacity greater than or equal to 0.9 milliequivalents per gram of dry resin tends to result in high proton conductivity. An ion exchange capacity smaller than or equal to 2.0 milliequivalents per gram of dry resin results in less swelling of resin with water and a smaller dimensional change of the polymer electrolyte membrane 1. The polymer electrolyte membrane 1 preferably has a thickness in the range of 5 to 50 µm. A thickness of 5 µm or more results in high gas barrier properties, and a thickness of 50 µm or less results in high proton conductivity.

The gas diffusion layers have a current collecting function, gas permeability, and water repellency and, as illustrated in FIG. 1, may be composed of two layers: a cathode gas diffusion layer substrate 4a and a cathode coating layer 4b (carbon layer) and an anode gas diffusion layer substrate 5a and an anode coating layer 5b (carbon layer).

The cathode gas diffusion layer substrate 4a and the anode gas diffusion layer substrate 5a is composed of an electrically conductive, gas- and liquid-permeable material, for example, a porous material, such as carbon paper, carbon fiber cloth, or carbon fiber felt. The carbon layers constituting the cathode coating layer 4b and the anode coating layer 5b are disposed between the cathode gas diffusion layer substrate 4a and the catalyst layer and between the anode gas diffusion layer substrate 5a and the catalyst layer, respectively. The carbon layers reduce the contact resistance between these layers and improve liquid permeability (drainability). For example, the cathode coating layer 4b and the anode coating layer 5b are formed of carbon particles (third carbon particles or fourth carbon particles) composed mainly of an electrically conductive material, such as carbon black, and a water-repellent resin, such as polytetrafluoroethylene (PTFE). The carbon layers may be composed mainly of a water-repellent resin or may be composed of the components of the carbon particles contained in the catalyst layers.

The catalyst layers promote the electrochemical reactions. At least one catalyst layer (particularly the cathode catalyst layer 2) of a pair of electrodes contains mesoporous carbon, a catalytic metal, and an ionomer (proton-conducting resin). The catalytic metal is loaded at least within the mesoporous carbon. The mesoporous carbon on a surface (a surface of the catalyst layer) opposite the polymer electrolyte membrane 1 is covered with carbon particles with a smaller particle size than the mesoporous carbon.

More specifically, as illustrated in FIG. 2, a catalyst layer composed entirely of a layer containing mesoporous carbon loaded with a catalytic metal (first layer) has a rough surface due to the large particle size of the mesoporous carbon.

As illustrated in FIG. 3, in a catalyst layer of a membrane catalyst layer assembly 20 according to an embodiment of the present disclosure, a second layer containing carbon particles is formed on a first layer. In FIG. 3, for convenience, the boundary between the first layer and the second layer is indicated with a white dash-dotted line. The first surface layer 21a and the second surface layer 21b are indicated with a white broken line.

As illustrated in FIG. 3, in the catalyst layer, a volume percentage of mesoporous carbon in the second surface layer 21b opposite the polymer electrolyte membrane 1 lower than a volume percentage of mesoporous carbon in the first surface layer 21 α adjacent to the polymer electrolyte membrane 1. In other words, if each mesoporous carbon particle is loaded with almost the same amount of catalytic metal, in the catalyst layer, a volume percentage of the catalytic metal in the second surface layer 21b opposite the polymer electrolyte membrane 1 lower than a volume percentage of the catalytic metal in the first surface layer 21 α adjacent to the polymer electrolyte membrane 1.

The first surface layer 21a of the catalyst layer has a main surface adjacent to the polymer electrolyte membrane 1, has a predetermined thickness, and contains mesoporous carbon. The second surface layer 21b has a main surface opposite the polymer electrolyte membrane 1, has a predetermined thickness, and contains mesoporous carbon. The first surface layer 21a and the second surface layer 21b may have a predetermined thickness greater than or equal to the average particle size of mesoporous carbon, for example.

The first surface layer 21a and the second surface layer 21b may contain carbon particles with the same composition (first carbon particles). Alternatively, the composition of carbon particles in the first surface layer 21a (first carbon particles) may be different from the composition of carbon particles in the second surface layer 21b (second carbon particles). The second carbon particles in the second surface layer 21b have a higher volume percentage than the first carbon particles in the first surface layer 21a.

Thus, in the catalyst layer of the membrane catalyst layer assembly 20 according to an embodiment of the present disclosure, mesoporous carbon is covered with carbon particles. A volume percentage of the mesoporous carbon in the second surface layer 21b is lower than a volume percentage of the mesoporous carbon in the first surface layer 21a. Thus, the carbon particles can reduce roughness due to the large particle size of the mesoporous carbon. This can reduce an increase in the contact resistance between the catalyst layer of the membrane catalyst layer assembly 20 in the electrochemical device and a gas diffusion layer in contact with the catalyst layer.

The mesopores of mesoporous carbon according to an embodiment of the present disclosure preferably have a mode radius in the range of 1 to 25 nm and a pore volume in the range of 1.0 to 3.0 cm$^3$/g, before loading of a catalytic metal. When the pore volume of mesopores is 1.0 cm$^3$/g or more, a large amount of catalytic metal can be loaded within mesoporous carbon. When the pore volume of mesopores is 3.0 cm$^3$/g or less, the mesoporous carbon structure has increased strength.

Mesoporous carbon according to an embodiment of the present disclosure has an average particle size of 100 to 1000 nm. An average particle size of 100 nm or more results in a decreased proportion of catalytic metal suffering ionomer poisoning. Thus, an average particle size of 100 nm or more results in improved catalytic activity compared with known catalyst layers, for example. An average particle size of 1000 nm or less makes it easier to supply a reactant gas to a catalytic metal loaded within mesoporous carbon.

For example, as indicated with the solid line in FIG. 4, the relative activity increases drastically as the average particle size of mesoporous carbon increases to approximately 1000 nm, and becomes almost constant after that.

The solid line in the graph of FIG. 4 represents the catalytic activities (calculated values) of catalysts containing Pt within mesoporous carbon with different particle sizes calculated on the following assumptions. First, it was assumed that Pt is evenly distributed within mesoporous carbon particles, and Pt at a distance of 40 nm or less from the surface of mesoporous carbon suffers ionomer poisoning. It was also assumed that the catalytic activity of Pt suffering poisoning is the same as the catalytic activity of known catalysts containing carbon black as a carrier, and the catalytic activity of Pt not suffering poisoning is 1.8 times the catalytic activity of catalysts containing carbon black as a carrier, for example. In the relationship between the catalytic activity calculated in this manner and the average particle size of mesoporous carbon, as indicated with the solid line in FIG. 4, the relative activity increases drastically as the average particle size of mesoporous carbon increases to approximately 1000 nm, and becomes almost constant after that.

It is therefore believed that increasing the average particle size of mesoporous carbon to approximately 1000 nm can advantageously reduce ionomer poisoning of a catalytic metal and increase catalytic activity. However, when the average particle size of mesoporous carbon is more than 1000 nm, a catalytic metal within the mesoporous carbon is not sufficiently supplied with a reactant gas, such as oxygen, and the catalytic activity is not improved.

Thus, the mesoporous carbon has an average particle size in the range of 100 to 1000 nm.

The pore volume and mode radius of mesopores in mesoporous carbon can be measured by a nitrogen adsorption method and can be analyzed by the Barrett-Joyner-Halenda (BJH) method, density functional theory (DFT), or quenched solid density functional theory (QSDFT).

The average particle size of mesoporous carbon may be measured in mesoporous carbon dispersed in a solvent with a laser diffraction particle size distribution analyzer or may be observed with a scanning electron microscope (hereinafter referred to as SEM) or a transmission electron microscope (hereinafter referred to as TEM).

When the particle size distribution of mesoporous carbon dispersed in a solvent is measured, mesoporous carbon particles should not aggregate. Thus, the solvent can preferably be water, alcohol, or a mixed solvent of water and alcohol. A dispersant is preferably added to the solvent to improve dispersibility. Examples of the dispersant include perfluorosulfonic acid resin, polyoxyethylene octylphenyl ether, and polyoxyethylene sorbitan monolaurate. To further improve dispersibility, a mixture of the solvent and mesoporous carbon is preferably subjected to a dispersion treatment. A dispersing apparatus, such as an ultrasonic homogenizer, a wet jet mill, a ball mill, or a mechanical agitator, may be used.

A method for producing mesoporous carbon contained in a catalyst layer according to an embodiment of the present disclosure is preferably, but not limited to, a method described in Japanese Unexamined Patent Application Publication No. 2010-208887 (Toyo Tanso Co., Ltd.), for example. Mesoporous carbon produced by such a method has communicating mesopores with a large pore volume.

Thus, a catalytic metal can be easily loaded within mesopores and can be easily supplied with gas. The average particle size of mesoporous carbon may be adjusted by grinding after synthesis. A grinding method with a wet bead mill, a dry bead mill, a wet ball mill, a dry ball mill, a wet jet mill, or a dry jet mill may be used. In particular, a wet bead mill can easily achieve a fine particle size by grinding.

Examples of the catalytic metal in the catalyst layer include platinum (Pt), ruthenium (Ru), palladium (Pd), iridium (Ir), silver (Ag), and gold (Au). In particular, platinum and its alloys are preferred because of their high catalytic activity in oxygen reduction reactions and high durability in a power generation environment of fuel cells. The catalytic metal is preferably in the form of particles. For example, the catalytic metal may have an average particle size in the range of 1 to 20 nm or 1 to 10 nm. A catalytic metal having an average particle size of 10 nm or less has a large surface area per unit weight and has improved reactivity. A catalytic metal having an average particle size of 1 nm or more results in improved stability of fine particles and less dissolution of the metal, for example, in a power generation environment of fuel cells.

The weight ratio of catalytic metal to mesoporous carbon preferably ranges from 0.65 to 1.5. If the amount of catalytic metal per unit surface area of mesoporous carbon increases, so that the weight ratio of catalytic metal to mesoporous carbon exceeds this range, the catalytic metal may aggregate. Conversely, if the amount of catalytic metal per unit surface area of mesoporous carbon decreases, so that the weight ratio of catalytic metal to mesoporous carbon is below this range, the amount of mesoporous carbon needs to be increased to ensure the required amount of catalytic metal, which results in an increased thickness of the catalyst layer.

The ionomer (proton-conducting resin) may be an ion-exchange resin. In particular, perfluorosulfonic acid resin is preferred because of its high proton conductivity and its stability in a power generation environment of fuel cells. The ion-exchange resin may have an ion exchange capacity in the range of 0.9 to 2.0 milliequivalents per gram of dry resin. An ion exchange capacity greater than or equal to 0.9 milliequivalents per gram of dry resin tends to result in high proton conductivity. An ion exchange capacity smaller than or equal to 2.0 milliequivalents per gram of dry resin results in less swelling of resin with water and lower likelihood of reduced gas diffusibility in the catalyst layer.

The weight ratio of the ionomer to total carbon contained in the catalyst layer preferably ranges from 0.3 to 1.0.

Carbon black or carbon nanotube may be added to the catalyst layer to improve drainability. The catalyst layer to which carbon particles with an average particle size in the range of 10 to 90 nm, preferably 30 to 50 nm, is added generally has high drainability due to capillarity.

Examples of the carbon black include ketjen black, acetylene black, Vulcan (bland name), and Black Pearls (bland name). Examples of the carbon nanotube include monolayer carbon nanotubes and multilayer carbon nanotubes. In particular, ketjen black, in which aggregates grow linearly, is preferred because even the addition of a small amount of ketjen black can form effective paths in the catalyst layer.

Method for Manufacturing Membrane Catalyst Layer Assembly

A method for manufacturing the membrane electrode assembly 10 according to an embodiment of the present disclosure, particularly a method for forming the catalyst layers of the membrane catalyst layer assembly 20, may be a method generally used for fuel cells. For example, the above materials are dispersed in a solvent containing water or alcohol, are applied to the polymer electrolyte membrane 1, and are dried to form the membrane catalyst layer assembly 20.

Figure 5:
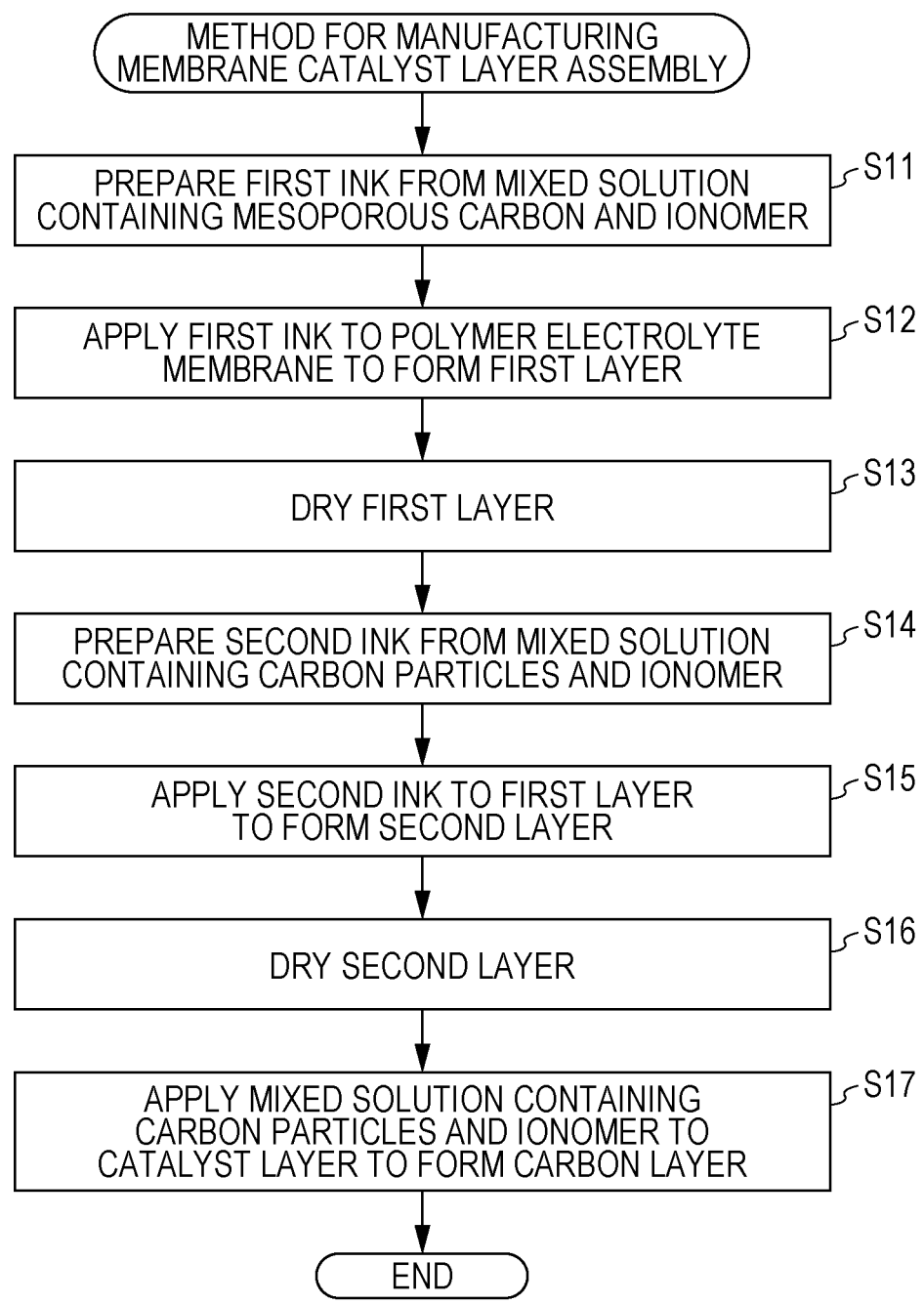
FIG. 5 is a flow chart of a method for manufacturing a membrane catalyst layer assembly according to an embodiment of the present disclosure.

More specifically, a method for manufacturing the membrane catalyst layer assembly 20 will be described below with reference to FIG. 5. FIG. 5 is a flow chart of a method for manufacturing the membrane catalyst layer assembly 20 according to an embodiment of the present disclosure.

As illustrated in FIG. 5, in a method for manufacturing the membrane catalyst layer assembly 20 according to the present disclosure, first, a first ink is prepared from a mixed solution containing mesoporous carbon and an ionomer (proton-conducting resin) (step S11). The mixed solution for the first ink may also contain carbon particles with a smaller average particle size than the mesoporous carbon (carbon particles with an average particle size in the range of 10 to 90 nm, preferably 30 to 50 nm). The addition of the carbon particles to the first ink allows the catalyst layer to have high drainability due to capillarity.

The first ink prepared in the step S11 is applied to the polymer electrolyte membrane 1 to form a first layer (step S12). After the first layer is dried (step S13), a second ink is prepared from a mixed solution containing carbon particles and an ionomer (step S14). The second ink prepared in the step S14 is applied to the first layer to form a second layer (step S15). The second layer formed on the first layer is dried (step S16).

A mixed solution containing carbon particles with a smaller average particle size than the mesoporous carbon and an ionomer is applied to a main surface of the catalyst layer prepared following the steps S11 to S16 to form a carbon layer (step S17). The carbon particles in the carbon layer may be composed mainly of an electrically conductive material, such as carbon black, and a water-repellent resin, such as polytetrafluoroethylene (PTFE).

A catalyst layer with such a structure according to an embodiment of the present disclosure can be used as the cathode catalyst layer 2. Such a catalyst layer may also be used as the anode catalyst layer 3. Alternatively, the anode catalyst layer 3 may have the same structure as a known catalyst layer generally used in the membrane catalyst layer assembly 20 of fuel cells. Thus, in the membrane catalyst layer assembly 20, a catalyst layer with the above structure is preferably used at least as the cathode catalyst layer 2.

In the case that the anode catalyst layer 3 has substantially the same structure as a known catalyst layer, the anode catalyst layer 3 can be formed as described below. For example, a carbon black supported platinum catalyst and a perfluorosulfonic acid resin can be dispersed in a solvent containing water or alcohol, applied to the polymer electrolyte membrane 1, and dried to form a catalyst layer.

The polymer electrolyte membrane, a pair of catalyst layers (the cathode catalyst layer 2 and the anode catalyst layer 3), a pair of carbon layers (the cathode coating layer 4b and the anode coating layer 5b), and a pair of gas diffusion layer substrates (the cathode gas diffusion layer substrate 4a and the anode gas diffusion layer substrate 5a) can be integrated to manufacture the membrane electrode assembly 10 according to an embodiment of the present disclosure.

Single Cell of Electrochemical Device (Fuel Cell)

Figures 6, 7:
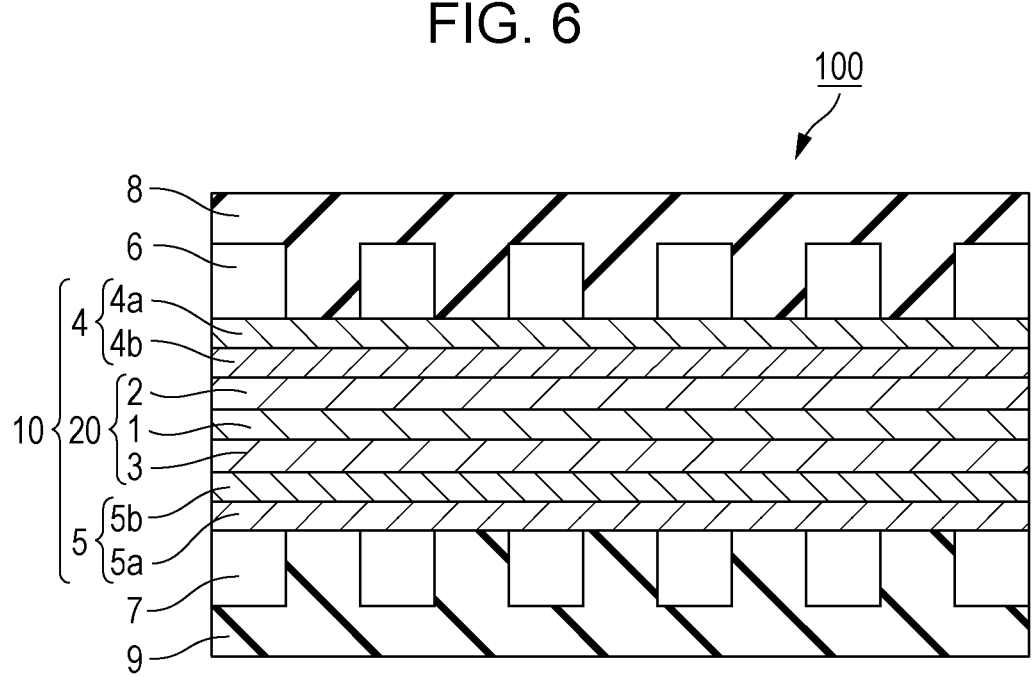
FIG. 6 is a schematic view of a single cell structure of an electrochemical device including the membrane electrode assembly illustrated in FIG. 1.
FIG. 7 is a table of the average particle size, the pore volume and mode radius of mesopores, and the BET specific surface area of a mesoporous carbon carrier according to an example of the present disclosure.

An electrochemical device (fuel cell) 100 including the membrane electrode assembly 10 will be described below with reference to FIG. 6. FIG. 6 is a schematic view of a single cell structure of the electrochemical device 100 including the membrane electrode assembly 10 illustrated in FIG. 1.

As illustrated in FIG. 6, in addition to the membrane electrode assembly 10 illustrated in FIG. 1, the single cell of the electrochemical device 100 further includes a pair of separators (a cathode separator 8 and an anode separator 9), which also serve as reactant gas (hydrogen or oxygen) supply paths (a cathode flow path 6 and an anode flow path 7). The pair of separators can hold the membrane electrode assembly 10 therebetween to form the single cell of the electrochemical device 100.

Oxygen is efficiently supplied to the cathode catalyst layer 2 through the cathode separator 8, and hydrogen is efficiently supplied to the anode catalyst layer 3 through the anode separator 9. The cathode separator 8 and the anode separator 9 can maintain electrical connection. The material of the cathode separator 8 and the anode separator 9 is a carbon material or a metallic material, for example. A group of the single cells of the electrochemical device 100 constitute a stack.

EXAMPLES

Examples of the present disclosure will be described below. First, a mesoporous carbon carrier shown in FIG. 7 was prepared. FIG. 7 is a table of the average particle size, the pore volume and mode radius of mesopores, and the BET specific surface area of a mesoporous carbon carrier according to an example of the present disclosure. The mesoporous carbon carrier according to the example is mesoporous carbon with an average particle size of 100 nm or more. As shown in FIG. 7, the mesoporous carbon carrier has mesopores with a mode radius in the range of 1 to 25 nm, and the mesopores have a pore volume in the range of 1.0 to 3.0 $cm^3/g$.

In the example of the present disclosure, commercially available porous carbon CNovel (trade name) (manufactured by Toyo Tanso Co., Ltd.) was used as mesoporous carbon. The mesoporous carbon was dispersed in a mixed solvent containing water and ethanol in equal proportions to prepare a slurry with a solid content of 3% by weight. Zirconia beads 0.3 mm in diameter were added to the slurry and were ground in a media agitating wet bead mill (Labstar mini, manufactured by Ashizawa Finetech Ltd.) at a peripheral speed of 12 m/s. The zirconia beads were removed from the ground slurry, and the solvent was evaporated. The resulting aggregate was ground in a mortar to produce a ground mesoporous carbon powder.

The average particle size (D50) of the mesoporous carbon was determined by the following method. The mesoporous carbon was dispersed in a mixed solvent containing water and ethanol in equal proportions to prepare a slurry with a solid content of 3% by weight. An ionomer Nafion (manufactured by Du Pont) was added to the slurry. The weight ratio of the ionomer to carbon was two. After ultrasonic dispersion, the particle size distribution of mesoporous carbon was measured with a laser diffraction particle size distribution analyzer Microtrac HRA (manufactured by MicrotracBEL Corp.). The average particle size (D50) was determined.

The pore volume and mode radius of mesopores and BET specific surface area of the mesoporous carbon thus produced were measured by the following method. The mesoporous carbon powder thus produced and ground was heat-treated at 200° C. for 3 hours to sufficiently remove water from the mesoporous carbon and was then analyzed with a nitrogen adsorption apparatus Autosorb-iQ (manufactured by Quantachrome Instruments).

In this manner, mesoporous carbon having mesopores with a mode radius and pore volume in predetermined ranges and having at least a predetermined average particle size was prepared.

A cathode catalyst layer of a membrane catalyst layer assembly according to the example was then formed as described below using porous carbon CNovel (trade name) (manufactured by Toyo Tanso Co., Ltd.) as mesoporous carbon. The cathode catalyst layer of the membrane catalyst layer assembly according to the example has a two-layer structure composed of a first layer containing mesoporous carbon loaded with a catalyst and a second layer formed of carbon particles with a smaller average particle size than the mesoporous carbon.

First, a first ink was applied to a polymer electrolyte membrane by a spray method. The first ink was prepared as described below.

Approximately 50% by weight of platinum was supported on the mesoporous carbon powder. The carbon-supported platinum and ketjen black (EC300J, manufactured by Lion Specialty Chemicals Co., Ltd.) were dispersed in a mixed solution containing water and ethanol in equal proportions to prepare a first layer slurry. The weight of ketjen black was half the weight of the ground mesoporous carbon.

An ionomer (Nafion, manufactured by Du Pont) was then added to the first layer slurry and was dispersed by ultrasonic dispersion to prepare a first ink. The weight ratio of the ionomer to total carbon (mesoporous carbon and ketjen black) was 0.8.

The first ink was applied to a polymer electrolyte membrane (Gore Select III, manufactured by W. L. Gore & Associates, Co., Ltd.) by a spray method and was dried to form a first layer of a cathode catalyst layer.

A second ink was then prepared as described below. Ketjen black was dispersed in a mixed solution containing water and ethanol in equal proportions to prepare a second layer slurry. The ionomer was added to the second layer slurry and was dispersed by ultrasonic dispersion to prepare a second ink. The weight ratio of the ionomer to ketjen black was 0.8.

The second ink was applied to the first layer on the polymer electrolyte membrane by the spray method and was dried to form a second layer of the cathode catalyst layer.

Although the first ink and the second ink were applied by the spray method in the example of the present disclosure, the first ink and the second ink may be applied by another method, for example, by die coating.

To compare the performance of the membrane catalyst layer assembly manufactured in the example of the present disclosure with the performance of a known membrane catalyst layer assembly, a membrane catalyst layer assembly according to a comparative example was prepared as a known membrane catalyst layer assembly. Unlike the catalyst layer of the membrane catalyst layer assembly according to the example, the membrane catalyst layer assembly according to the comparative example did not have a two-layer structure, and only the first ink was applied to a polymer electrolyte membrane by the spray method.

In the assembly of the polymer electrolyte membrane and the cathode catalyst layer in the membrane catalyst layer assembly according to the example, an anode catalyst layer was formed on a surface of the polymer electrolyte membrane opposite the cathode catalyst layer to manufacture the membrane catalyst layer assembly according to the example.

Likewise, in the assembly of the polymer electrolyte membrane and the cathode catalyst layer in the membrane catalyst layer assembly according to the comparative example, an anode catalyst layer was formed on a surface of the polymer electrolyte membrane opposite the cathode catalyst layer to manufacture the membrane catalyst layer assembly according to the comparative example.

Each anode catalyst layer of the membrane catalyst layer assembly according to the example and the membrane catalyst layer assembly according to the comparative example was formed by applying an ink prepared for the anode catalyst layer (hereinafter referred to as an anode catalyst layer ink) to the polymer electrolyte membrane by the spray method. The anode catalyst layer ink was prepared by dispersing an ionomer in an anode catalyst layer slurry. The anode catalyst layer slurry was prepared by dispersing carbon black supported platinum (TEC10E50E, manufactured by Tanaka Kikinzoku Kogyo K.K.) in a mixed solution containing water and ethanol in equal proportions.

More specifically, the anode catalyst layer ink was prepared by ultrasonic dispersion of the ionomer in the anode catalyst layer slurry. The weight ratio of the ionomer to total carbon was 0.8. The anode catalyst layer ink thus prepared was applied to a surface of the polymer electrolyte membrane opposite the cathode catalyst layer by the spray method to form each anode catalyst layer of the membrane catalyst layer assembly according to the example and the membrane catalyst layer assembly according to the comparative example.

In the membrane catalyst layer assembly according to the example and the membrane catalyst layer assembly according to the comparative example on which the cathode catalyst layer and the anode catalyst layer were formed, a gas diffusion layer (GDL25BC, manufactured by SGL Carbon Japan) was placed on the cathode catalyst layer and the anode catalyst layer and was pressed at a high temperature of 140° C. and at a pressure of 7 kgf/cm$^2$ for 5 minutes to adhere to the catalyst layers.

A membrane electrode assembly according to the example and a membrane electrode assembly according to the comparative example were manufactured in this manner.

In the membrane electrode assembly according to the example and the membrane electrode assembly according to the comparative example, the gas diffusion layer adjacent to the anode catalyst layer and the gas diffusion layer adjacent to the cathode catalyst layer were placed between a pair of separators to manufacture a single cell of a fuel cell. The separators had a serpentine flow path.

The resistance overvoltages of the single cells according to the example and the comparative example thus manufactured were measured by the following method.

First, while the single cells according to the example and the comparative example were held at a temperature of 80° C., hydrogen with a dew point of 80° C. was supplied to the anode, and air with a dew point of 80° C. was supplied to the cathode. The flow rates of hydrogen and air supplied were much larger than the amounts of hydrogen and air to be consumed in the reaction. The electrical resistances of the single cells according to the example and the comparative example were in-situ measured with a low-resistance meter with a fixed frequency of 1 kHz during constant current operation with an electronic load PLZ-664WA (manufactured by Kikusui Electronics Corporation).

Figure 8:
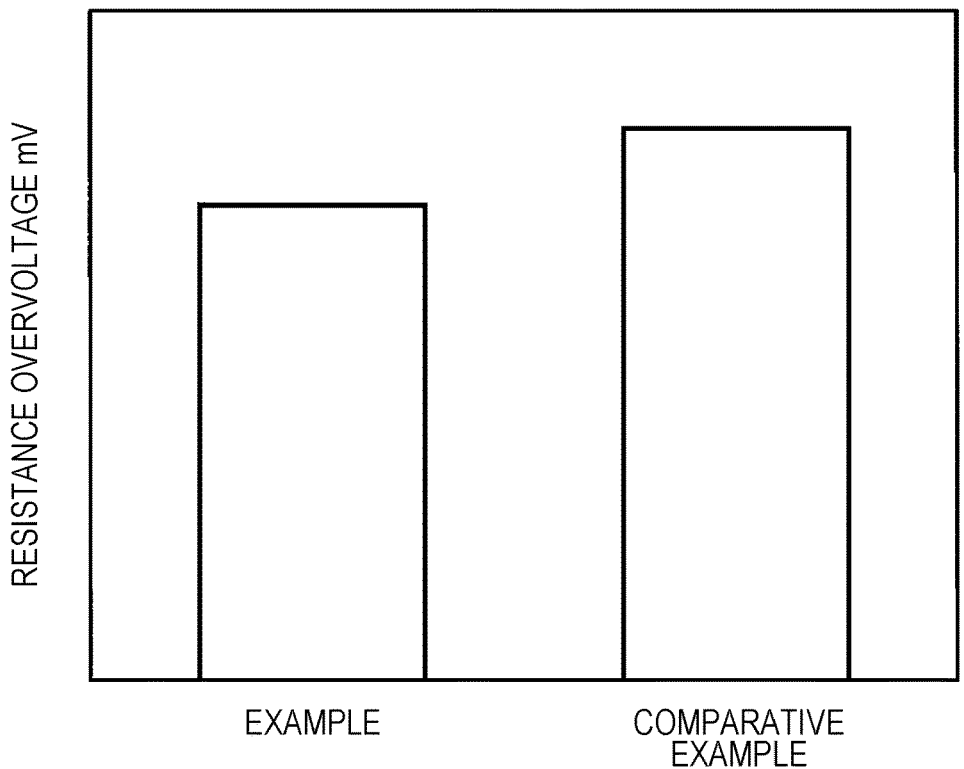
FIG. 8 is a graph of the resistance overvoltage of a single cell according to an example of the present disclosure compared with the resistance overvoltage of a single cell according to a comparative example.

The electrical resistances of the single cells according to the example and the comparative example measured by this method were compared as resistance overvoltages, which are voltage drops during power generation. FIG. 8 illustrates the results. FIG. 8 is a graph of the resistance overvoltage of the single cell according to the example of the present disclosure compared with the resistance overvoltage of the single cell according to the comparative example.

As illustrated in FIG. 8, if the resistance overvoltage in the comparative example is 1, then the resistance overvoltage in the example is 0.86, indicating that the example could significantly decrease the resistance overvoltage.

From the above description, various other modifications and embodiments of the present disclosure would be obvious to a person skilled in the art. Thus, the description should be construed as only an example and is provided a person skilled in the art with the mode for implementing the present disclosure. The details of the structure and/or function can be substantially changed without departing from the spirit of the present disclosure.

The present disclosure is useful for a membrane electrode assembly of a cell in fuel cells, for example.

What is claimed is:

1. A membrane catalyst layer assembly of an electrochemical device, comprising:
   a polymer electrolyte membrane; and
   a pair of catalyst layers disposed on main surfaces of the polymer electrolyte membrane,
   wherein one of the pair of catalyst layers contains:
      mesoporous carbon with an average particle size of 100 nm or more, the mesoporous carbon having mesopores with a mode radius in the range of 1 to 25 nm and a pore volume in the range of 1.0 to 3.0 cm$^3$/g;
      a catalytic metal;
      a proton-conducting resin; and
      at least one type of carbon particles with a smaller average particle size than the mesoporous carbon,
   the one of the pair of catalyst layers has a first surface layer which is adjacent to the polymer electrolyte membrane and contains the mesoporous carbon, and a second surface layer which is opposite the polymer electrolyte membrane and contains the mesoporous carbon, and
   a volume percentage of the mesoporous carbon in the second surface layer is lower than a volume percentage of the mesoporous carbon in the first surface layer.

2. A membrane catalyst layer assembly of an electrochemical device, comprising:
   a polymer electrolyte membrane; and
   a pair of catalyst layers disposed on main surfaces of the polymer electrolyte membrane, wherein one of the pair of catalyst layers contains:
      mesoporous carbon with an average particle size of 100 nm or more, the mesoporous carbon having mesopores with a mode radius in the range of 1 to 25 nm and a pore volume in the range of 1.0 to 3.0 cm$^3$/g;
      a catalytic metal supported on the mesoporous carbon;
      a proton-conducting resin; and
      at least one type of carbon particles with a smaller average particle size than the mesoporous carbon,
   the one of the pair of catalyst layers has a first surface layer which is adjacent to the polymer electrolyte membrane and contains the mesoporous carbon, and a second surface layer which is opposite the polymer electrolyte membrane and contains the mesoporous carbon, and
   a volume percentage of the catalytic metal in the second surface layer is lower than a volume percentage of the catalytic metal in the first surface layer.

3. The membrane catalyst layer assembly of the electrochemical device according to claim 1, wherein the mesoporous carbon has the average particle size of 1000 nm or less.

4. The membrane catalyst layer assembly of the electrochemical device according to claim 1, wherein
   the at least one type of carbon particles contain first carbon particles, and
   a volume percentage of the first carbon particles in the second surface layer is higher than a volume percentage of the first carbon particles in the first surface layer.

5. The membrane catalyst layer assembly of the electrochemical device according to claim 1, wherein
   the at least one type of carbon particles contain first carbon particles in the first surface layer and second carbon particles in the second surface layer, and
   a volume percentage of the second carbon particles is higher than a volume percentage of the first carbon particles.

6. The membrane catalyst layer assembly of the electrochemical device according to claim 1, wherein the at least one type of carbon particles have an average primary particle size in the range of 30 to 50 nm.

7. The membrane catalyst layer assembly of the electrochemical device according to claim 1, wherein the one of the pair of catalyst layers is a cathode catalyst layer.

8. A membrane electrode assembly comprising:
   the membrane catalyst layer assembly according to claim 1; and
   a pair of gas diffusion layers disposed on the pair of catalyst layers of the membrane catalyst layer assembly.

9. The membrane electrode assembly according to claim 8, wherein
   a gas diffusion layer disposed on one of the pair of catalyst layers has a carbon layer containing third carbon particles on its main surface in contact with the one of the pair of catalyst layers, and
   the carbon layer has higher water repellency than a surface layer of the one of the pair of catalyst layers adjacent to the gas diffusion layer.

10. The membrane electrode assembly according to claim 9, wherein
    the surface layer of the catalyst layer adjacent to the gas diffusion layer contains the proton-conducting resin, and
    the carbon layer contains a water-repellent resin.

11. An electrochemical device comprising the membrane electrode assembly according to claim 8.

12. The membrane electrode assembly according to claim 1, wherein, in a state where a carbon layer containing third carbon particles and having water repellency is not provided on one main surface of the pair of catalyst layers, the volume percentage of the mesoporous carbon in the second surface layer is lower than the volume percentage of the mesoporous carbon in the first surface layer.

13. The membrane electrode assembly according to claim 2, wherein, in a state where a carbon layer containing third carbon particles and having water repellency is not provided on one main surface of the pair of catalyst layers, a volume percentage of the mesoporous carbon in the second surface layer is lower than a volume percentage of the mesoporous carbon in the first surface layer.

14. The membrane electrode assembly according to claim 1, wherein, in a state where a gas diffusion layer is not provided on one main surface of the pair of catalyst layers, the volume percentage of the mesoporous carbon in the second surface layer is lower than the volume percentage of the mesoporous carbon in the first surface layer.

15. The membrane electrode assembly according to claim 2, wherein, in a state where a gas diffusion layer is not provided on one main surface of the pair of catalyst layers, a volume percentage of the mesoporous carbon in the second surface layer is lower than a volume percentage of the mesoporous carbon in the first surface layer.

* * * * *